United States Patent
Chen et al.

(10) Patent No.: US 11,709,417 B2
(45) Date of Patent: Jul. 25, 2023

(54) ILLUMINATION SYSTEM AND PROJECTION DEVICE

(71) Applicant: Coretronic Corporation, Hsin-Chu (TW)

(72) Inventors: Yu-Sheng Chen, Hsin-Chu (TW); Jo-Han Hsu, Hsin-Chu (TW); Kuan-Ta Huang, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/680,131

(22) Filed: Feb. 24, 2022

(65) Prior Publication Data
US 2022/0269157 A1   Aug. 25, 2022

(30) Foreign Application Priority Data

Feb. 25, 2021   (CN) .......................... 202120415989.8

(51) Int. Cl.
*G03B 21/20*   (2006.01)

(52) U.S. Cl.
CPC ....... *G03B 21/208* (2013.01); *G03B 21/2066* (2013.01); *G03B 21/2073* (2013.01)

(58) Field of Classification Search
CPC .............. G03B 21/208; G03B 21/2066; G03B 21/2073
USPC ........................................................ 353/20
See application file for complete search history.

(56) References Cited

U.S. PATENT DOCUMENTS

| | | | |
|---|---|---|---|
| 7,483,216 B2* | 1/2009 | Penn | G02B 5/04 359/638 |
| 2008/0158512 A1* | 7/2008 | Mizushima | G03B 21/2033 348/E9.026 |
| 2010/0265466 A1* | 10/2010 | Lescure | G02B 27/104 353/20 |
| 2013/0222875 A1* | 8/2013 | Chifu | G03B 21/2033 359/201.1 |
| 2020/0073218 A1* | 3/2020 | Yamamoto | G03B 21/204 |

FOREIGN PATENT DOCUMENTS

| | | |
|---|---|---|
| CN | 210573154 | 5/2020 |
| TW | 684788 | 2/2020 |

* cited by examiner

*Primary Examiner* — Jerry L Brooks
(74) *Attorney, Agent, or Firm* — JCIPRNET (57) ABSTRACT

An illumination system and a projection device having good uniformity are provided. The illumination system includes at least one light source, a depolarizing element, and a light homogenizing element. The at least one light source is configured to provide multiple beams. The depolarizing element is disposed on a transmission path of the beams. The depolarizing element includes a first optical element, which is wedge-shaped and has a first optical axis. A direction of any one of the beams incident onto the first optical element is parallel to the first optical axis. The beams respectively become multiple linearly polarized beams with different polarization directions after passing through the first optical element. The light homogenizing element is configured to allow the linearly polarized beams to pass through to form an illumination beam. The depolarizing element is located between the at least one light source and the light homogenizing element.

22 Claims, 7 Drawing Sheets

ILLUMINATION SYSTEM AND PROJECTION DEVICE

CROSS-REFERENCE TO RELATED APPLICATION

This application claims the priority benefit of China application serial no. 202120415989.8, filed on Feb. 25, 2021. The entirety of the above-mentioned patent application is hereby incorporated by reference herein and made a part of this specification.

BACKGROUND

Technical Field

The disclosure relates to an optical system and an optical device, and particularly relates to an illumination system and a projection device.

Description of Related Art

Recently, the projection device based on a solid-state light source such as a light-emitting diode (LED) and a laser diode (LD) has gradually gained a place in the market. Due to the advantages of high collimation, strong energy, convergent light source, etc., the laser diode has become the mainstream light source for modern projectors.

However, since the laser beam provided by the laser diode is a coherent beam, and the coherent beam has high coherence, when the laser beam irradiates onto an uneven surface of an object (such as a lens element or a reflector), the unevenness of the surface of the object would cause reflected or scattered light to form an optical path difference therebetween, so as to form a constructive or destructive interference phenomenon in space. Furthermore, a necessary condition for the interference phenomenon is that the polarization directions of interfering beams cannot be perpendicular to each other. However, since the laser beam is a linearly polarized light beam with very consistent polarization directions, the interference phenomenon is likely to occur, thereby generating speckles on an irradiated surface. Such kind of speckles is an irregular noise-like pattern with seemingly irregular bright and dark noise spots, which would cause uneven brightness on the irradiated surface, thereby causing the image quality of the projection device applied with such light source to drop, such that the visual perception of the user becomes worse.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system, which can provide an illumination beam with good uniformity.

The disclosure provides a projection device, which can provide a screen with good image quality.

Other purposes and advantages of the disclosure may be further understood from the technical features disclosed in the disclosure.

In order to achieve one, a part, or all of the above purposes or other purposes, an embodiment of the disclosure provides an illumination system. The illumination system includes at least one light source, a depolarizing element, and a light homogenizing element. The at least one light source is configured to provide multiple beams. The depolarizing element is disposed on a transmission path of the beams. The depolarizing element includes a first optical element. The first optical element is wedge-shaped and has a first optical axis. A direction of each of the beams incident onto the first optical element is parallel to the first optical axis. The beams respectively become multiple linearly polarized beams with different polarization directions after passing through the first optical element. The light homogenizing element is configured to allow the linearly polarized beams to pass through to form an illumination beam. The depolarizing element is located between the at least one light source and the light homogenizing element.

In order to achieve one, a part, or all of the above purposes or other purposes, an embodiment of the disclosure provides a projection device. The projection device includes the illumination system, a light valve, and a projection lens. The light valve is disposed on a transmission path of the illumination beam from the illumination system and is configured to convert the illumination beam into an image beam. The projection lens is disposed on a transmission path of the image beam and is configured to project the image beam out of the projection device.

Based on the above, the embodiments of the disclosure have at least one of the following advantages or effects. In the embodiments of the disclosure, through the configuration of the wedge-shaped depolarizing element, the illumination system and the projection device can enable the polarization directions of at least one part of the beams to be perpendicular to the polarization directions of another part of the beams, thereby eliminating the speckle phenomenon.

Other purposes, features, and advantages of the disclosure will be further understood from the further technological features disclosed by the embodiments of the disclosure wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the direction of the Figure(s) being described. The components of the disclosure can be positioned in a number of different directions. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
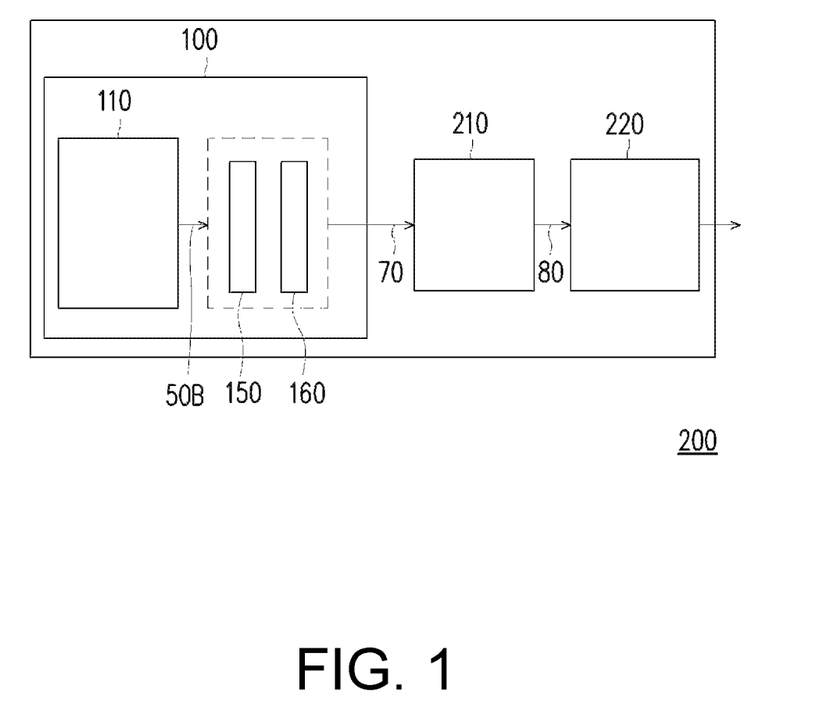
FIG. 1 is a schematic diagram of a structure of a projection device according to an embodiment of the disclosure.

FIG. 1 is a schematic diagram of a structure of a projection device according to an embodiment of the disclosure. Please refer to FIG. 1, a projection device 200 includes an illumination system 100, a light valve 210, and a projection lens 220. The illumination system 100 is configured to provide an illumination beam 70. The light valve 210 is disposed on a transmission path of the illumination beam 70 from the illumination system 100 and is configured to convert the illumination beam 70 into an image beam 80. The projection lens 220 is disposed on a transmission path of the image beam 80 and is configured to project the image beam 80 out of the projection device 200. After the illumination beam 70 is converged on the light valve 210, the light valve 210 may sequentially transmit the image beam 80 of different colors formed by the illumination beam 70 to the projection lens 220. Therefore, an image projected by the image beam 80 converted by the light valve 210 can form a color image. In this embodiment, the number of the light valve 210 is one, but the disclosure is not limited thereto. In other embodiments, the number of the light valve 210 may be more than one. In addition, in this embodiment, the light valve 210 may be a digital micro-mirror device (DMD) or a liquid-crystal-on-silicon panel (LCOS panel). However, in other embodiments, the light valve 210 may also be a transmissive liquid crystal panel or other beam modulators.

The illumination system 100 will be further explained below in conjunction with FIG. 2A to FIG. 2D.

Figure 2A:
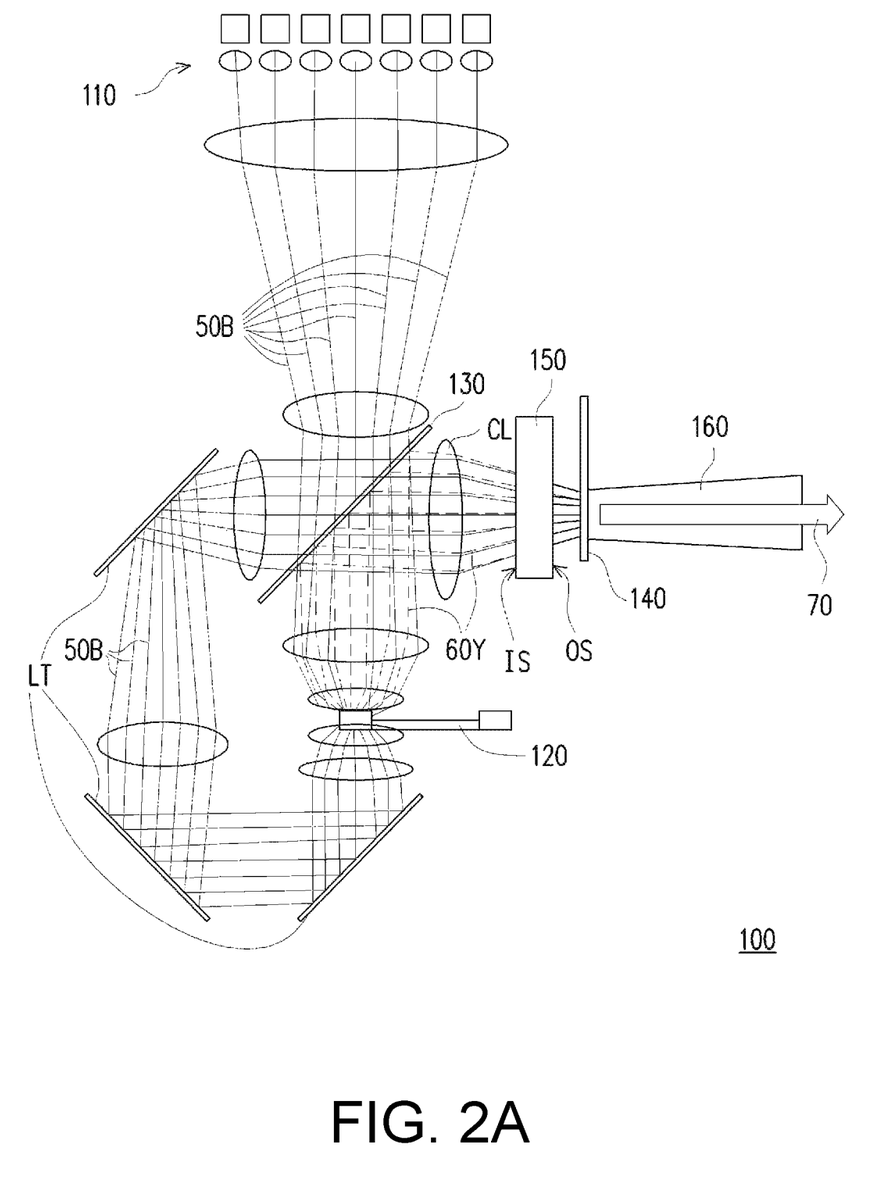
FIG. 2A is a schematic diagram of a structure of an illumination system of FIG. 1.

FIG. 2A is a schematic diagram of a structure of an illumination system of FIG. 1. Specifically, as shown in FIG. 1, in this embodiment, the illumination system 100 includes at least one light source 110, a wavelength conversion module 120, a light splitting element 130, a light filtering module 140, a focusing element CL, a depolarizing element 150, and a light homogenizing element 160. As shown in FIG. 2A, in this embodiment, the at least one light source 110 is configured to emit multiple beams 50B. In this embodiment, the at least one light source 110 is a laser light source, and the beams 50B are blue laser beams. For example, the at least one light source 110 may include multiple blue laser diodes arranged in an array, but the disclosure is not limited thereto. In other embodiments, the at least one light source 110 may include one laser diode. However, since the beams 50B have high coherence and are linearly polarized beams with very consistent polarization direction, such that an interference phenomenon is likely to occur, and laser speckles are formed on an irradiated surface. Therefore, in this embodiment, the illumination system 100 is disposed with the depolarizing element 150 on transmission paths of the beams 50B to disorder the polarization direction of the beams 50B, and the beams 50B with polarization directions perpendicular to each other after passing through the depolarizing element 150, so as to destroy the interference phenomenon, thereby eliminating the speckle phenomenon.

The process of eliminating the speckle phenomenon by the depolarizing element will be further explained below in conjunction with FIG. 2B to FIG. 2D.

Figure 2B:
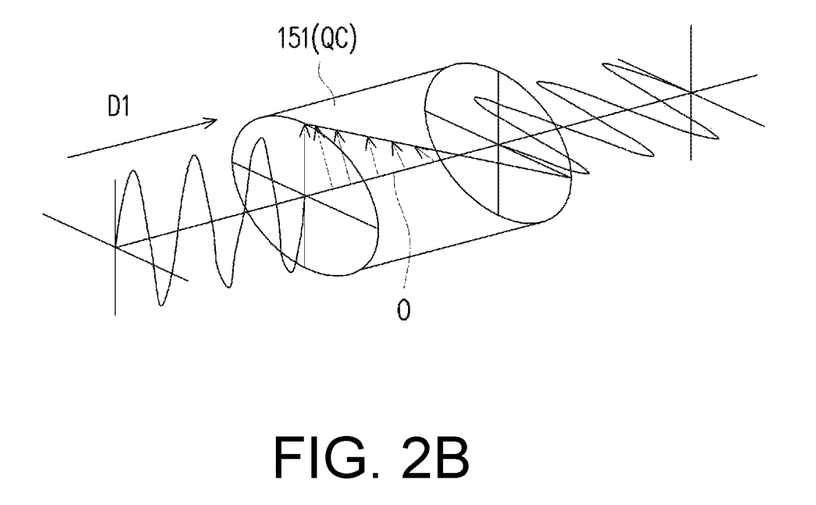
FIG. 2B is a schematic diagram of a first optical axis of a first optical element and a variation of a polarization direction of a beam passing through according to an embodiment of the disclosure.

FIG. 2B is a schematic diagram of a first optical axis of a first optical element and a variation of a polarization direction of a beam passing through according to an embodiment of the disclosure. FIG. 2C is a schematic diagram of different polarization directions of parallel beams passing through a depolarizing element according to an embodiment of the disclosure. FIG. 2D is an enlarged schematic diagram of a partial optical path of a beam passing through the depolarizing element of FIG. 2A. FIG. 2D only shows the optical paths of the depolarizing element 150 and the light homogenizing element 160 in FIG. 2A as examples (the light filtering module 140 is omitted). Specifically, as shown in FIG. 2A, the depolarizing element 150 is disposed on the transmission paths of the beams 50B, and the depolarizing element 150 has a light incident surface IS and a light outgoing surface OS opposite to the light incident surface IS. The light incident surface IS is parallel to the light outgoing surface OS. As shown in FIG. 2C, the depolarizing element 150 includes a first optical element 151 and a second optical element 152. Furthermore, as shown in FIG. 2A and FIG. 2B, the first optical element 151 has a first optical axis O. The direction of the beams 50B incident on the first optical element 151 is parallel to the first optical axis O. For example, in this embodiment, the first optical element 151 is a quartz crystal element QC, and the first optical axis O is a crystal optical axis of the quartz crystal element QC. Furthermore, as shown in FIG. 2B, due to the optical rotation characteristic of the quartz crystal element QC, when a beam (such as any one of the beams 50B) passes through the quartz crystal element QC along the first optical axis O, the linear polarization direction thereof is rotated by an angle. The size of the angle is related to the refractive index of the material and the thickness of the quartz crystal element QC which the beam passes through. When the linearly polarized beams pass through different positions of the quartz crystal element, the linear polarization direction of the beams 50B is rotated by different angles, so as to disorder the polarization directions in the beams 50B. Furthermore, as shown in FIG. 2C and FIG. 2D, the first optical element 151 is wedge-shaped and the thickness thereof changes gradually. Therefore, the beams 50B may respectively be multiple linearly polarized beams with different polarization directions after passing through the first optical element 151. Moreover, as shown in FIG. 2C and FIG. 2D, the polarization directions of at least one part of the beams 50B are perpendicular to the polarization directions of another part of the beams 50B, so as to be configured to eliminate the speckle phenomenon.

Figure 2C:
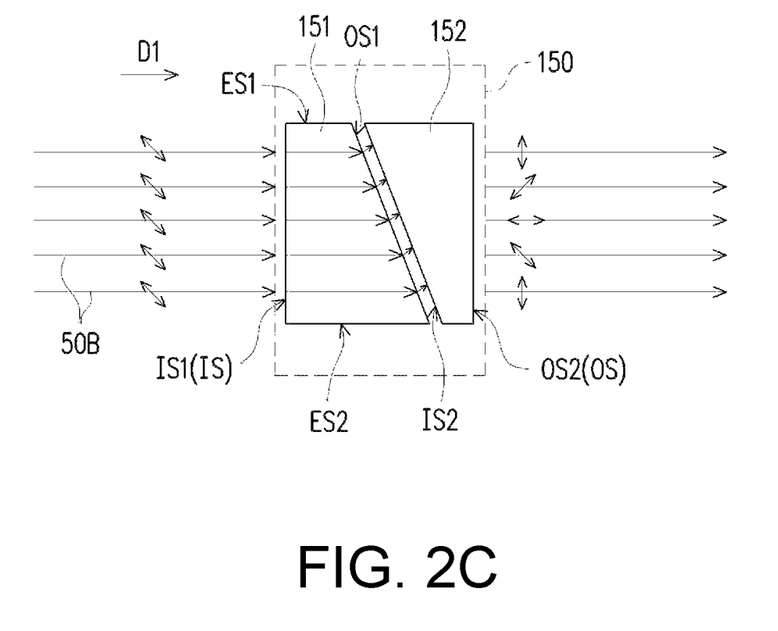
FIG. 2C is a schematic diagram of different polarization directions of parallel beams passing through a depolarizing element according to an embodiment of the disclosure.
Figure 2D:
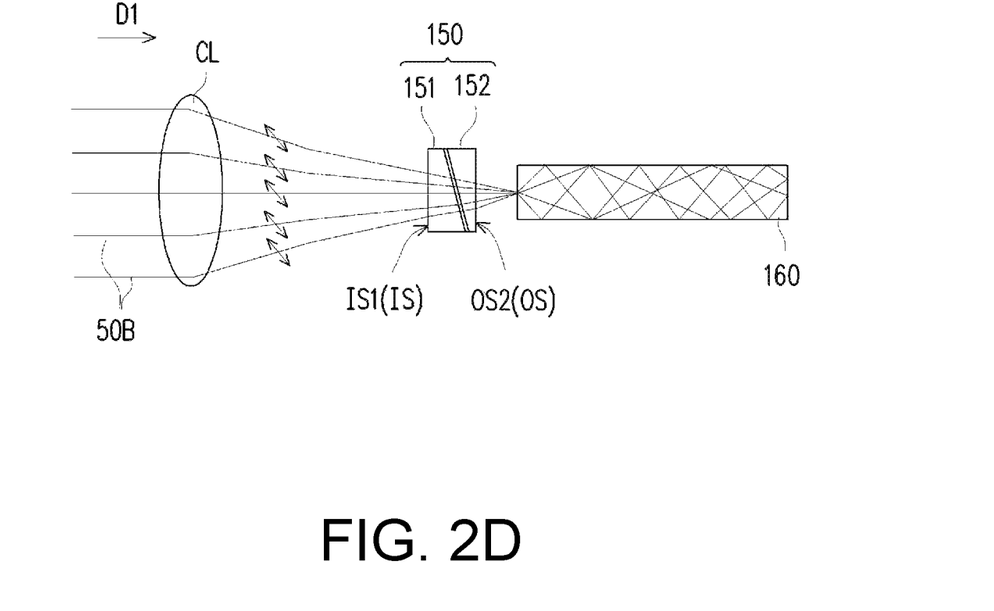
FIG. 2D is an enlarged schematic diagram of a partial optical path of a beam passing through the depolarizing element of FIG. 2A.

Specifically, as shown in FIG. 2B to FIG. 2D, the first optical element 151 of the depolarizing element 150 has a first light incident surface IS1, a first end surface ES1, a second end surface ES2, and a first light outgoing surface OS1. The first end surface ES1 and the second end surface ES2 are opposite to each other and are both connected to the first light incident surface IS1 and the first light outgoing surface OS1. The first light incident surface IS1 and the first light outgoing surface OS1 are not parallel to each other. The beams 50B are incident onto the first light incident surface IS1 of the first optical element 151 along a first direction D1. The first direction D1 is parallel to the first optical axis O of the first optical element 151 as shown in FIG. 2B. As shown in FIG. 2C and FIG. 2D, the width dimension of the first end surface ES1 in the first direction D1 is a first dimension, the width dimension of the second end surface ES2 in the first direction D1 is a second dimension, and the width of the first optical axis element 151 in the first direction D1 is gradually changed from the first dimension of the first end surface ES1 to the second dimension of the second end surface ES2.

On the other hand, as shown in FIG. 2C and FIG. 2D, in this embodiment, the shape of the first optical element 151 and the shape of the second optical element 152 are geometrically symmetrical, and the first optical element 151 and the second optical element 152 are both wedge-shaped. Furthermore, the second optical element 152 has a second light incident surface IS2 and a second light outgoing surface OS2 that are not parallel. The first light outgoing surface OS1 of the first optical element 151 is parallel to the second light incident surface IS2 of the second optical element 152, and the first light incident surface IS1 of the first optical element 151 is parallel to the second light outgoing surface OS2 of the second optical element 152. The first light incident surface IS1 of the first optical element 151 is the light incident surface IS of the depolarizing element 150, the second light outgoing surface OS2 of the second optical element 152 is the light outgoing surface OS of the depolarizing element 150, and the first light incident surface IS1 is perpendicular to the first direction D1. In addition, the second optical element 152 is, for example, a fused quartz element and has a refractive index close to that of the quartz crystal element QC. In this way, the second optical element 152 may be configured to compensate the deflection displacement of beams passing through the first optical element 151, so as to correct transmission directions of the beams 50B.

For example, as shown in FIG. 2B to FIG. 2D, in this embodiment, a gap is formed between the first light outgoing surface OS1 of the first optical element 151 and the second light incident surface IS2 of the second optical element 152. In addition, the first light outgoing surface OS1 of the first optical element 151 and the second light incident surface IS2 of the second optical element 152 are inclined at a first angle relative to the first optical axis O as shown in FIG. 2B. The first angle is greater than 1 degree. In addition, a bonding member (not shown) is disposed between the first light outgoing surface OS1 of the first optical element 151 and the second light incident surface IS2 of the second optical element 152. For example, in this embodiment, the bonding member (not shown) is an adhesive, and the bonding member (not shown) is not located on the transmission paths of the beams 50B, but is disposed on a peripheral region of the depolarizing element 150. The peripheral region surrounds a light passing region of the depolarizing element 150 for the beams 50B to pass through. For example, the bonding member (not shown) is disposed on the peripheral region of the first light outgoing surface OS1 of the first optical element 151, and the light passing region of the first light outgoing surface OS1 is not disposed with a bonding member, such that the peripheral region of the first light outgoing surface OS1 of the first optical element 151 is adhered with a corresponding peripheral region of the second light incident surface IS2 of the second optical element 152. In this way, the first optical element 151 and the second optical element 152 may be bonded. For example, in this embodiment, the contour of the peripheral region of the depolarizing element 150 may be round or square, but the disclosure is not limited thereto.

In this way, as shown in FIG. 2C and FIG. 2D, when the beams 50B provided by the at least one light source 110 pass through the depolarizing element 150 and are then transmitted to the subsequent optical element, such as the light homogenizing element 160, the illumination beam 70 formed by the beams 50B may be homogenized to improve the uniformity of the illumination beam 70, so that the projection device 200 can provide an image with good image quality. The following will further explain the formation process of the illumination beam 70.

Specifically, as shown in FIG. 2A, in this embodiment, the light splitting element 130 is disposed on the transmission paths of the beams 50B and is located between the at least one light source 110 and the wavelength conversion module 120. Specifically, the light splitting element 130 may be a partially transmissive and partially reflective element, a dichroic element, a polarization light splitting element, or various other elements that can separate beams. For example, in this embodiment, the light splitting element 130 allows blue beams to pass through and reflects beams with other colors (such as red, green, yellow, etc.). In other words, the light splitting element 130 allows the blue beams 50B to pass through. In this way, the beams 50B may pass through the light splitting element 130 to be incident onto the wavelength conversion module 120.

For example, as shown in FIG. 2A, the wavelength conversion module 120 is located on the transmission paths of the beams 50B, and has at least one wavelength conversion region (not shown). A phosphor material is disposed on the at least one wavelength conversion region of the wavelength conversion module 120 and is configured to convert the beams 50B into at least one wavelength conversion beam 60Y. A wavelength of the wavelength conversion beam 60Y is different from the wavelength of the beams 50B. The light penetrating region (not shown) of the wavelength conversion module 120 is configured to allow the beams 50B to pass through to be transmitted to the subsequent optical element, so as to form the blue beams in the illumination beam 70. In addition, the wavelength conversion module 120 also includes a first actuator (not shown). The first actuator may be a motor, and is used to drive the wavelength conversion module 120 to move for allowing the light penetrating region and the at least one wavelength conversion region of the wavelength conversion module 120 to enter the transmission path of the beams 50B in different time periods, so as to selectively allow the beams 50B to pass through to form the blue beams in the illumination beam 70 or to be converted into the at least one wavelength conversion beam 60Y.

For example, as shown in FIG. 2A, a substrate of the wavelength conversion module 120 is made of a transparent material. The at least one wavelength conversion region and the light penetrating region are disposed on the substrate. In other words, the wavelength conversion module 120 is a transmissive wavelength conversion module 120 and is configured to allow the beams 50B to pass through the light penetrating region thereof. Furthermore, as shown in FIG. 2A, in this embodiment, when the light penetrating region (not shown) of the wavelength conversion module 120 enters the transmission path of the beams 50B, the beams 50B pass through the wavelength conversion module 120 to be transmitted to the subsequent optical element via an optical transmission module LT. On the other hand, in this embodiment, the at least one wavelength conversion region of the wavelength conversion module 120 has a structure of a reflective layer (not shown), and the reflective layer is disposed on the substrate and is correspondingly located on the at least one wavelength conversion region. When the at least one wavelength conversion region enters the transmission path of the beams 50B, the beams 50B are converted by the at least one wavelength conversion region into the at least one wavelength conversion beam 60Y. The at least one wavelength conversion beam 60Y is reflected by the reflective layer to be guided to the light splitting element 130. Then, as shown in FIG. 2A, the at least one wavelength conversion beam 60Y from the wavelength conversion module 120 may be reflected by the light splitting element 130 to the subsequent optical element.

In addition, as shown in FIG. 2A, the light filtering module 140, the depolarizing element 150, and the light homogenizing element 160 are sequentially located on the transmission paths of the beams 50B and the wavelength conversion beam 60Y from the light splitting element 130. The light filtering module 140 is located between the depolarizing element 150 and the light homogenizing element 160. After the at least one wavelength conversion beam 60Y and the beams 50B pass through the depolarizing element 150, multiple linearly polarized beams with different polarization directions may be formed, and the interference phenomenon is not likely to occur.

In addition, as shown in FIG. 2A, the light filtering module 140 has at least two light filtering optical regions (not shown) and a transparent region (not shown). In this embodiment, the light filtering optical regions are, for example, a red light filtering optical region and a green light filtering optical region for respectively allowing beams of corresponding waveands to pass through. The light filtering module 140 also includes a second actuator (not shown). The second actuator may be a motor, and is used to drive the light filtering module 140 to move for allowing the light filtering optical regions (not shown) to correspondingly enter the transmission path of the wavelength conversion beam 60Y at different time periods, so as to respectively form a red beam and a green beam. On the other hand, through the second actuator (not shown), the transparent region (not shown) also correspondingly enters the transmission path of the beams 50B transmitted to the light filtering module 140 at different time periods, so as to form the blue beams. In this way, the illumination beams 70 with multiple different colors may be formed by the beams 50B and the wavelength conversion beam 60Y in different time periods.

On the other hand, as shown in FIG. 2A, in this embodiment, the light homogenizing element 160 is located on the transmission path of the illumination beam 70 from the light filtering module 140. In this embodiment, the light homogenizing element 160 may be an integrating rod, but the disclosure is not limited thereto. In more detail, as shown in FIG. 2A, when the illumination beam 70 is transmitted to the light homogenizing element 160 via the illumination system 100, the light homogenizing element 160 may homogenize the illumination beam 70 and transmit the illumination beam 70 to the light valve 210. In this way, the illumination beam 70 formed by the depolarizing element 150 and the light homogenizing element 160 has good uniformity, so that the projection device 200 can provide an image with good image quality.

Figure 3A:
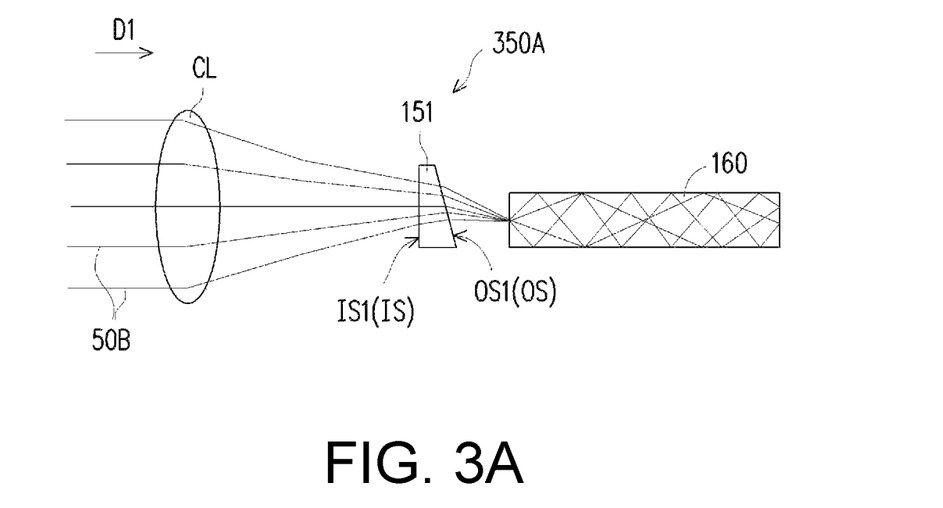
FIG. 3A and FIG. 3B are enlarged schematic diagrams of partial optical paths of the depolarizing element different from the depolarizing element in FIG. 2A.
Figure 3B:
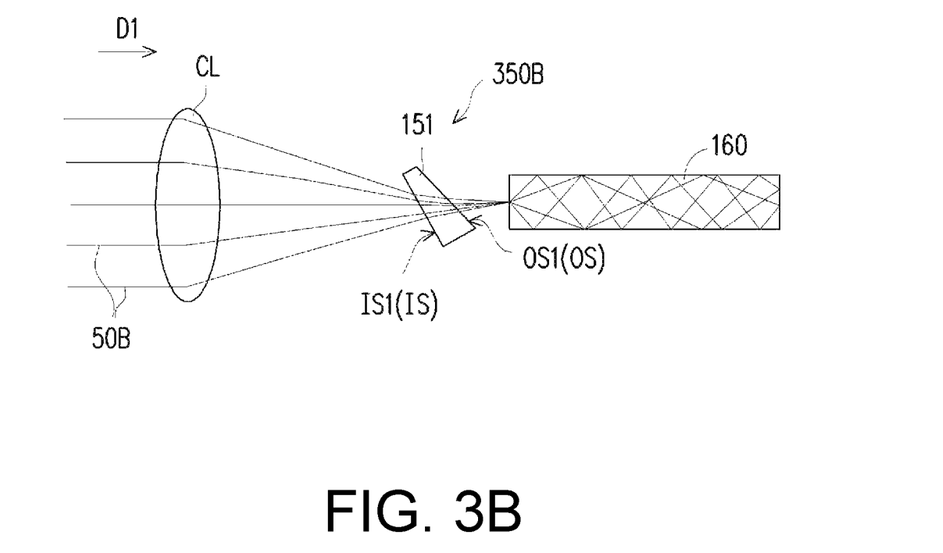

FIG. 3A and FIG. 3B are enlarged schematic diagrams of partial optical paths of the depolarizing element different from the depolarizing element in FIG. 2A. FIG. 3A and FIG. 3B only show the optical paths of the depolarizing elements and the light homogenizing element 160 as examples (the light filtering module 140 in FIG. 2A is omitted). Please refer to FIG. 3A and FIG. 3B, depolarizing elements 350A and 350B of the embodiment are similar to the depolarizing element 150 of FIG. 2D, and the differences as follows. In the embodiment of FIG. 3A, the depolarizing element 350A is composed of only the first optical element 151. The first light incident surface IS1 of the first optical element 151 is the light incident surface IS of the depolarizing element 350A, the first light outgoing surface OS1 of the first optical element 151 is the light outgoing surface OS of the depolarizing element 350A, and the first light incident surface IS1 is perpendicular to the first direction D1. Also, the beams 50B and the wavelength conversion beam 60Y (as shown in FIG. 2A) passing through the depolarizing element 350A are transmitted into the light homogenizing element 160 by fine-tuning the position of the light homogenizing element 160. In this way, when the depolarizing element 350A replaces the depolarizing element 150 and is applied to the illumination system 100 and the projection device 200, the illumination system 100 and the projection device 200 can further save the material of the depolarizing element while achieving the aforementioned effects and advantages, which will not be repeated here.

On the other hand, in the embodiment of FIG. 3B, the depolarizing element 350B is also composed of only the first optical element 151. Also, the angle of the depolarizing element 350B relative to the first direction D1 is fine-tuned, so that the first light incident surface IS1 is neither perpendicular nor parallel to the first direction D1, and the beams 50B and the wavelength conversion beam 60Y (as shown in FIG. 2A) passing through the depolarizing element 350A are transmitted into the light homogenizing element 160. In this way, when the depolarizing element 350B replaces the depolarizing element 150 and is applied to the illumination system 100 and the projection device 200, the illumination system 100 and the projection device 200 can also further save the material of the depolarizing element and form a good light receiving effect while achieving the aforementioned effects and advantages, which will not be repeated here.

Figure 4A:
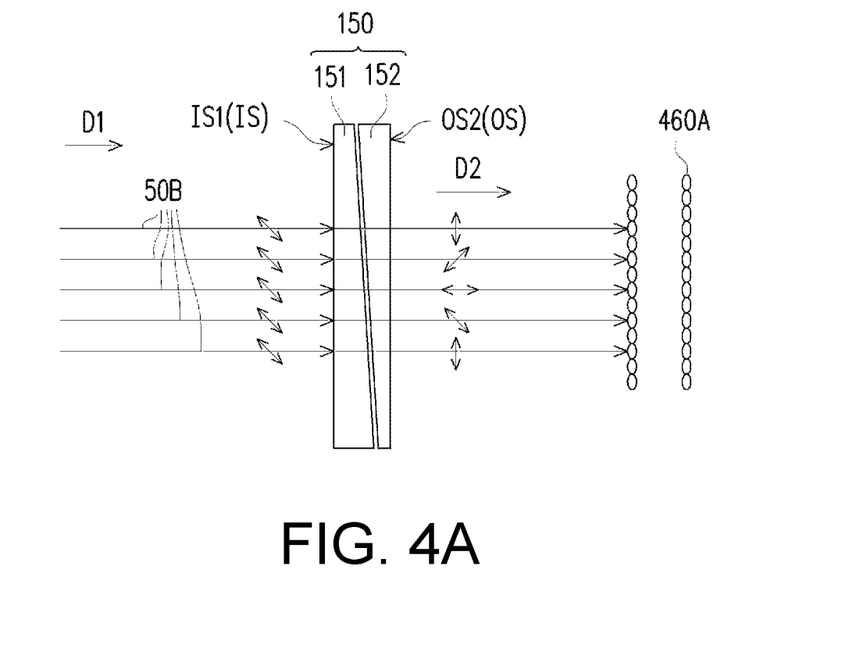
FIG. 4A and FIG. 4B are enlarged schematic diagrams of partial optical paths of the depolarizing element and the light homogenizing element different from the depolarizing element and the light homogenizing element in FIG. 1.
Figure 4B:
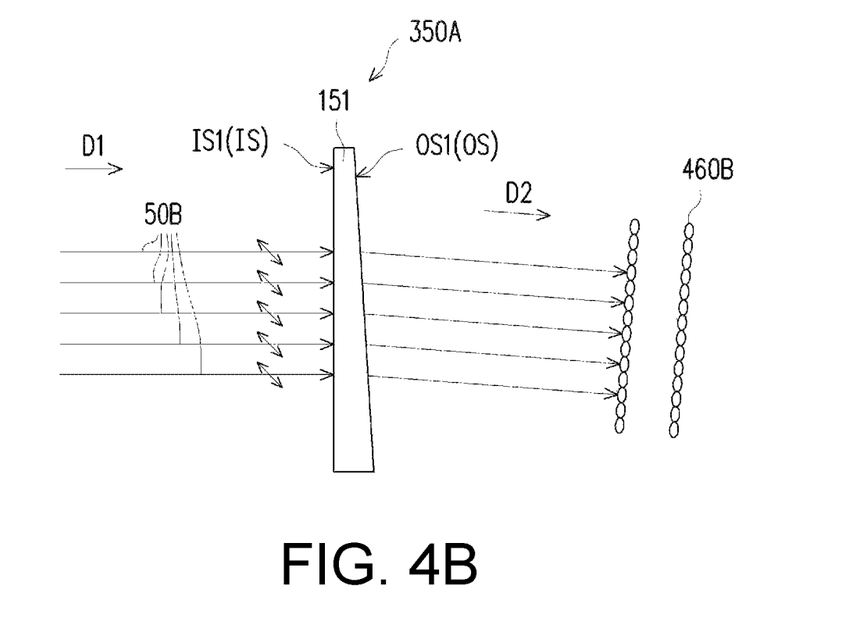

FIG. 4A and FIG. 4B are enlarged schematic diagrams of partial optical paths of the depolarizing element and the light homogenizing element different from the depolarizing element and the light homogenizing element in FIG. 1. FIG. 4A and FIG. 4B only show the optical paths of the depolarizing elements and the light homogenizing elements as examples (the light filtering module is omitted). Please refer to FIG. 4A and FIG. 4B. The embodiment of FIG. 4A adopts the depolarizing element 150 of FIG. 2D, the embodiment of FIG. 4B adopts the depolarizing element 350A of FIG. 3A, and light homogenizing elements 460A and 460B of this embodiment are similar to the homogenizing element 160 of FIG. 2A. The differences as follows. In the embodiments of FIG. 4A and FIG. 4B, the light homogenizing elements 460A and 460B are lens element arrays. Also, as shown in FIG. 4A, the beams 50B leave the depolarizing element 150 along a second direction D2 and is transmitted to the light homogenizing elements 460A. As shown in FIG. 4B, the beams 50B leave the depolarizing element 350A along a second direction D2 and are transmitted to the light homogenizing elements 460B. Also, the second direction D2 is perpendicular to a surface of the light homogenizing element 460A in FIG. 4A and a surface of the light homogenizing element 460B in FIG. 4B. The surface of the light homogenizing element 460A in FIG. 4A faces the depolarizing element 150. The surface of the light homogenizing element 460B in FIG. 4B faces the depolarizing element 350A. In this way, in the embodiments of FIG. 4A and FIG. 4B, the configuration of the focusing element CL shown in FIG. 2 may be omitted.

In addition, in the embodiment of FIG. 4B, the light incident surface IS of the depolarizing element 350A is inclined at a second angle relative to the surface of the light homogenizing element 460B facing the depolarizing element 350A. The second angle is greater than 1 degree. Furthermore, in the embodiment of FIG. 4B, the light incident surface IS of the depolarizing element 350A is perpendicular to the direction (that is, the first direction DO of the beams 50B incident onto the first optical element 151 (the depolarizing element 350A). Therefore, the light homogenizing element 460B is inclined relative to the first direction D1, so that the beams 50B are transmitted along the second direction D2 and enter the light homogenizing element 460B at an appropriate angle after leaving the first optical element 151 (the depolarizing element 350A), but the disclosure is not limited thereto. In another embodiment not shown, the light homogenizing element 460B may also not be inclined relative to the first direction D1, but may be perpendicular to the direction of the beams 50B incident onto the first optical element 151 (that is, the first direction DD. In addition, based on the calculation of the refractive and deflective characteristics, the first optical element 151 (the depolarizing element 350A) may be adjusted to a specific angle, so that the light incident surface IS of the depolarizing element 350A is not perpendicular to the incident direction (that is, the first direction DO of the beams 50B, and the beams 50B are transmitted along the same optical axis after leaving the first optical element 151. In this way, there is no need to further adjust the position of the surface of the light homogenizing element 460B while the overall optical path can still achieve the aforementioned effects.

Figure 5:
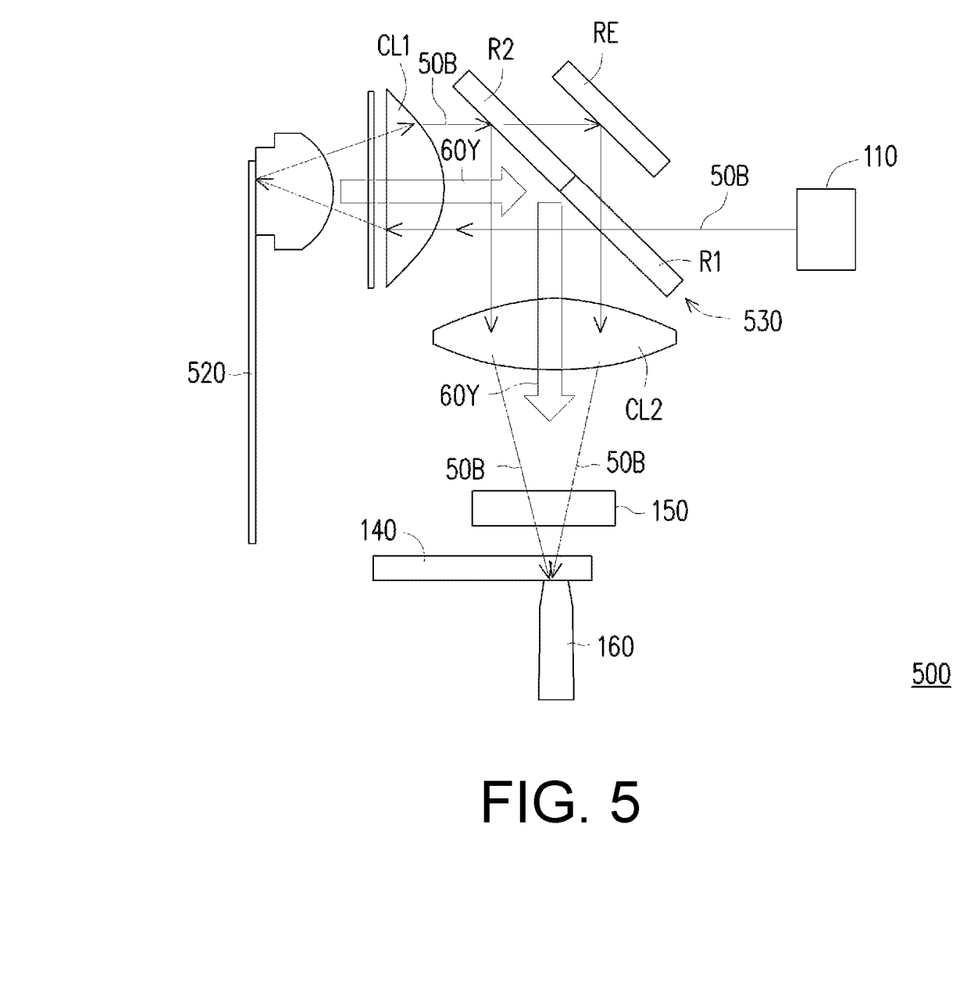
FIG. 5 is a schematic diagram of a structure of another illumination system of FIG. 1.

FIG. 5 is a schematic diagram of a structure of another illumination system of FIG. 1. Please refer to FIG. 5, an illumination system 500 of this embodiment is similar to the illumination system 100 of FIG. 2A, and the differences between the two as follows. In this embodiment, a wavelength conversion module 520 adopted by the illumination system 500 is a reflective wavelength conversion module, that is, a substrate of the wavelength conversion module 520 is, for example, a metal material for reflecting a laser beam (the beams 50B). Moreover, in this embodiment, a light splitting element 530 has a first region R1 and a second region R2. For example, in this embodiment, the first region R1 of the light splitting element 530 may, for example, allow a blue beam to pass through and reflect beams with other colors (such as red, green, yellow, etc.). In other words, the first region R1 of the light splitting element 530 may allow the blue beams 50B to pass through. Also, as shown in FIG. 5, in this embodiment, the light splitting element 530 and a first condense lens element CL1 are located on the transmission paths of the beams 50B emitted from the at least one light source 110, the light splitting element 530 is located between the at least one light source 110 and the wavelength conversion module 520, and the first condense lens element CL1 is located between the light splitting element 530 and the wavelength conversion module 520. In this way, when the beams 50B pass through the first region R1 of the light splitting element 530, the beams 50B may be obliquely incident onto the wavelength conversion module 520 via the first condense lens element CL1, thereby forming the wavelength conversion beam 60Y converted and reflected by a wavelength conversion region of the wavelength conversion module 520. The beams 50B may be obliquely incident onto a blue light reflection region of the wavelength conversion module 520 via the first condense lens element CL1, and the beams 50B is reflected by a blue light reflection region to the second region R2 of the light splitting element 530. The second region R2 of the light splitting element 530 may allow a part of the blue beam to pass through and reflect a part of the blue beam and beams with other colors. A transmission path of the part of the blue beam passing through the second region R2 is disposed with an optical element RE to reflect the part of the blue beam. The part of the blue beam reflected by the optical element RE sequentially passes through the first region R1 of the light splitting element 530, a condense lens element CL2, the depolarizing element 150, and the light filtering module 140 to enter the light homogenizing element 160.

Furthermore, as shown in FIG. 5, during a first period, since the wavelength conversion beam 60Y is yellow light, the at least one wavelength conversion beam 60Y from the wavelength conversion module 520 may be reflected by the light splitting element 530 and then is transmitted and converged to the light filtering module 140 by the condense lens element CL2. On the other hand, during a second period, after the beams 50B are reflected by the blue reflection region (not shown) of the wavelength conversion module 520, the beams 50B is transmitted to the second region R2 of the light splitting element 530 via the first condense lens element CL1. Then, the beams 50B are reflected by the optical element RE and is converged by the condense lens element CL2, so as to be transmitted to the light filtering module 140. After that, the light filtering module 140 respectively forms the beam (the beam 50B) and the at least one conversion beam 60Y into the blue beam, the red beam, and the green beam, thereby forming the subsequent illumination beam 70 and image beam 80.

In this way, through the configuration of the depolarizing element 150, the illumination system 500 can also enable the polarization directions of at least one part of the beams 50B to be perpendicular to the polarization directions of another part of the beams 50B, thereby eliminating the speckle phenomenon and achieving the aforementioned effects and advantages, which will not be repeated here. When the illumination system 500 is applied to the projection device 200, the projection device 200 can also achieve the aforementioned effects and advantages, which will not be repeated here.

In summary, the embodiments of the disclosure have at least one of the above advantages or effects. In the embodiments of the disclosure, through the configuration of the wedge-shaped depolarizing element, the illumination system and the projection device can enable the polarization directions of at least one part of the beams to be perpendicular to the polarization directions of another part of the beams, thereby eliminating the speckle phenomenon.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An illumination system, comprising at least one light source, a depolarizing element, and a light homogenizing element, wherein:
the at least one light source is configured to provide a plurality of beams having a linear polarization direction;
the depolarizing element is disposed on a transmission path of the beams, the depolarizing element comprises a first optical element, the first optical element is wedge-shaped and has a first optical axis, the first optical element is a quartz crystal element, the first optical axis is a crystal optical axis of the quartz crystal element, a direction of each of the beams incident onto the first optical element is parallel to the first optical axis, and the beams respectively become a plurality of linearly polarized beams with different polarization directions after passing through the first optical element; and
the light homogenizing element is configured to allow the linearly polarized beams to pass through to form an illumination beam, wherein the depolarizing element is located between the at least one light source and the light homogenizing element.

2. The illumination system according to claim 1, wherein the first optical element has a first light incident surface, a first end surface, a second end surface, and a first light outgoing surface, the first end surface and the second end surface are both connected to the first light incident surface and the first light outgoing surface, the first light incident surface and the first light outgoing surface are not parallel to each other, the beams are incident onto the first optical element along a first direction, the first direction is parallel to the first optical axis, a width dimension of the first end surface in the first direction is a first dimension, a width dimension of the second end surface in the first direction is a second dimension, and a width of the first optical element in the first direction gradually changes from the first dimension to the second dimension.

3. The illumination system according to claim 2, wherein the depolarizing element has a light incident surface and a light outgoing surface, and the light incident surface is parallel to the light outgoing surface.

4. The illumination system according to claim 3, wherein the depolarizing element further comprises a second optical element, the second optical element has a second light incident surface and a second light outgoing surface that are not parallel, the first light outgoing surface is parallel to the second light incident surface, the first light incident surface is parallel to the second light outgoing surface, the first light incident surface of the first optical element is the light incident surface of the depolarizing element, the second light outgoing surface of the second optical element is the light outgoing surface of the depolarizing element, and the first light incident surface is perpendicular to the first direction.

5. The illumination system according to claim 1, wherein the depolarizing element further comprises a second optical element, and a shape of the first optical element and a shape of the second optical element are geometrically symmetrical.

6. The illumination system according to claim 4, wherein the depolarizing element further comprises a bonding member, and the bonding member is disposed between the first optical element and the second optical element and is not located on the transmission path of the beams, so that the first optical element and the second optical element are bonded.

7. The illumination system according to claim 4, wherein a gap is formed between the first light outgoing surface of the first optical element and the second light incident surface of the second optical element, the first light outgoing surface of the first optical element and the second light incident surface of the second optical element are inclined at a first angle relative to the first optical axis, and the first angle is greater than 1 degree.

8. The illumination system according to claim 2, wherein the first light incident surface is perpendicular to the first direction, the first light outgoing surface of the first optical element is inclined at a first angle relative to the first end surface, and the first angle is greater than 1 degree.

9. The illumination system according to claim 7, wherein the beams leave the first optical element along a second direction, and the second direction is perpendicular to a surface of the light homogenizing element facing the depolarizing element.

10. The illumination system according to claim 2, wherein the first light incident surface is not perpendicular to the first direction.

11. An illumination system, comprising at least one light source, a depolarizing element, and a light homogenizing element, wherein:
the at least one light source is configured to provide a plurality of beams;
the depolarizing element is disposed on a transmission path of the beams, the depolarizing element comprises a first optical element, the first optical element is wedge-shaped and has a first optical axis, a direction of each of the beams incident onto the first optical element is parallel to the first optical axis, and the beams respectively become a plurality of linearly polarized beams with different polarization directions after passing through the first optical element; and
the light homogenizing element is configured to allow the linearly polarized beams to pass through to form an illumination beam, wherein the depolarizing element is located between the at least one light source and the light homogenizing element,
wherein the first optical element has a first light incident surface, a first end surface, a second end surface, and a first light outgoing surface, the first end surface and the second end surface are both connected to the first light incident surface and the first light outgoing surface, the first light incident surface and the first light outgoing surface are not parallel to each other, the beams are incident onto the first optical element along a first direction, the first direction is parallel to the first optical axis, a width dimension of the first end surface in the first direction is a first dimension, a width dimension of the second end surface in the first direction is a second dimension, and a width of the first optical element in the first direction gradually changes from the first dimension to the second dimension,
wherein the depolarizing element has a light incident surface and a light outgoing surface, and the light incident surface is parallel to the light outgoing surface,
wherein the depolarizing element further comprises a second optical element, the second optical element has a second light incident surface and a second light outgoing surface that are not parallel, the first light outgoing surface is parallel to the second light incident surface, the first light incident surface is parallel to the second light outgoing surface, the first light incident surface of the first optical element is the light incident surface of the depolarizing element, the second light outgoing surface of the second optical element is the light outgoing surface of the depolarizing element, and the first light incident surface is perpendicular to the first direction,
wherein a gap is formed between the first light outgoing surface of the first optical element and the second light incident surface of the second optical element, the first light outgoing surface of the first optical element and the second light incident surface of the second optical element are inclined at a first angle relative to the first optical axis, and the first angle is greater than 1 degree,
wherein the beams leave the first optical element along a second direction, and the second direction is perpendicular to a surface of the light homogenizing element facing the depolarizing element,
wherein the light incident surface of the depolarizing element is inclined at a second angle relative to the surface of the light homogenizing element facing the depolarizing element, and the second angle is greater than 1 degree.

12. A projection device, comprising an illumination system, at least one light valve, and a projection lens, wherein:
the illumination system is configured to provide an illumination beam, and the illumination system comprises at least one light source, a depolarizing element, and a light homogenizing element, wherein:
the at least one light source is configured to provide a plurality of beams having a linear polarization direction;
the depolarizing element is disposed on a transmission path of the beams, the depolarizing element comprises a first optical element, the first optical element is wedge-shaped and has a first optical axis, the first optical element is a quartz crystal element, the first optical axis is a crystal optical axis of the quartz crystal element, a direction of each of the beams incident onto the first optical element is parallel to the first optical axis, and the beams respectively become a plurality of linearly polarized beams with different polarization directions after passing through the first optical element; and
the light homogenizing element is configured to allow the linearly polarized beams to pass through to form an illumination beam, wherein the depolarizing element is located between the at least one light source and the light homogenizing element;
the at least one light valve is disposed on a transmission path of the illumination beam and is configured to convert the illumination beam into an image beam; and
the projection lens is disposed on a transmission path of the image beam and is configured to project the image beam out of the projection device.

13. The projection device according to claim 12, wherein the first optical element has a first light incident surface, a first end surface, a second end surface, and a first light outgoing surface, the first end surface and the second end surface are both connected to the first light incident surface and the first light outgoing surface, the first light incident surface and the first light outgoing surface are not parallel to each other, the beams are incident onto the first optical element along a first direction, the first direction is parallel to the first optical axis, a width dimension of the first end surface in the first direction is a first dimension, a width dimension of the second end surface in the first direction is a second dimension, and a width of the first optical element in the first direction gradually changes from the first dimension to the second dimension.

14. The projection device according to claim 13, wherein the depolarizing element has a light incident surface and a light outgoing surface, and the light incident surface is parallel to the light outgoing surface.

15. The projection device according to claim 14, wherein the depolarizing element further comprises a second optical element, the second optical element has a second light incident surface and a second light outgoing surface that are not parallel, the first light outgoing surface is parallel to the second light incident surface, the first light incident surface is parallel to the second light outgoing surface, the first light incident surface of the first optical element is the light incident surface of the depolarizing element, the second light outgoing surface of the second optical element is the light outgoing surface of the depolarizing element, and the first light incident surface is perpendicular to the first direction.

16. The projection device according to claim 12, wherein the depolarizing element further comprises a second optical element, and a shape of the first optical element and a shape of the second optical element are geometrically symmetrical.

17. The projection device according to claim 15, wherein the depolarizing element further comprises a bonding member, and the bonding member is disposed between the first optical element and the second optical element and is not located on the transmission path of the beams, so that the first optical element and the second optical element are bonded.

18. The projection device according to claim 15, wherein a gap is formed between the first light outgoing surface of the first optical element and the second light incident surface of the second optical element, the first light outgoing surface of the first optical element and the second light incident surface of the second optical element are inclined at a first angle relative to the first optical axis, and the first angle is greater than 1 degree.

19. The projection device according to claim 13, wherein the first light incident surface is perpendicular to the first direction, the first light outgoing surface of the first optical element is inclined at a first angle relative to the first end surface, and the first angle is greater than 1 degree.

20. The projection device according to claim 18, wherein the beams leave the first optical element along a second direction, and the second direction is perpendicular to a surface of the light homogenizing element facing the depolarizing element.

21. The projection device according to claim 13, wherein the first light incident surface is not perpendicular to the first direction.

22. A projection device, comprising an illumination system, at least one light valve, and a projection lens, wherein:
the illumination system is configured to provide an illumination beam, and the illumination system comprises at least one light source, a depolarizing element, and a light homogenizing element, wherein:
the at least one light source is configured to provide a plurality of beams;
the depolarizing element is disposed on a transmission path of the beams, the depolarizing element comprises a first optical element, the first optical element is wedge-shaped and has a first optical axis, a direction of each of the beams incident onto the first optical element is parallel to the first optical axis, and the beams respectively become a plurality of linearly polarized beams with different polarization directions after passing through the first optical element; and
the light homogenizing element is configured to allow the linearly polarized beams to pass through to form an illumination beam, wherein the depolarizing element is located between the at least one light source and the light homogenizing element;
the at least one light valve is disposed on a transmission path of the illumination beam and is configured to convert the illumination beam into an image beam; and
the projection lens is disposed on a transmission path of the image beam and is configured to project the image beam out of the projection device,
wherein the first optical element has a first light incident surface, a first end surface, a second end surface, and a first light outgoing surface, the first end surface and the second end surface are both connected to the first light incident surface and the first light outgoing surface, the first light incident surface and the first light outgoing surface are not parallel to each other, the beams are incident onto the first optical element along a first direction, the first direction is parallel to the first optical axis, a width dimension of the first end surface in the first direction is a first dimension, a width dimension of the second end surface in the first direction is a second dimension, and a width of the first optical element in the first direction gradually changes from the first dimension to the second dimension,
wherein the depolarizing element has a light incident surface and a light outgoing surface, and the light incident surface is parallel to the light outgoing surface,
wherein the depolarizing element further comprises a second optical element, the second optical element has a second light incident surface and a second light outgoing surface that are not parallel, the first light outgoing surface is parallel to the second light incident surface, the first light incident surface is parallel to the second light outgoing surface, the first light incident surface of the first optical element is the light incident surface of the depolarizing element, the second light outgoing surface of the second optical element is the light outgoing surface of the depolarizing element, and the first light incident surface is perpendicular to the first direction,
wherein a gap is formed between the first light outgoing surface of the first optical element and the second light incident surface of the second optical element, the first light outgoing surface of the first optical element and the second light incident surface of the second optical element are inclined at a first angle relative to the first optical axis, and the first angle is greater than 1 degree,
wherein the beams leave the first optical element along a second direction, and the second direction is perpendicular to a surface of the light homogenizing element facing the depolarizing element, wherein the light incident surface of the depolarizing element is inclined at a second angle relative to a surface of the light homogenizing element facing the depolarizing element, and the second angle is greater than 1 degree.

* * * * *